US010249852B2

(12) United States Patent
Baik et al.

(10) Patent No.: US 10,249,852 B2
(45) Date of Patent: Apr. 2, 2019

(54) SECONDARY BATTERY INCLUDING CONNECTOR COUPLED TO ELECTRODE ASSEMBLY AND CURRENT COLLECTOR

(71) Applicant: Samsung SDI Co., Ltd., Yongin-si, Gyeonggi-do (KR)

(72) Inventors: Yunki Baik, Yongin-si (KR); Youngsik Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 323 days.

(21) Appl. No.: 15/136,837

(22) Filed: Apr. 22, 2016

(65) Prior Publication Data

US 2017/0084900 A1 Mar. 23, 2017

(30) Foreign Application Priority Data

Sep. 18, 2015 (KR) .................. 10-2015-0132406

(51) Int. Cl.
| | |
|---|---|
| *H01M 2/04* | (2006.01) |
| *H01M 2/06* | (2006.01) |
| *H01M 2/12* | (2006.01) |
| *H01M 2/22* | (2006.01) |
| *H01M 2/34* | (2006.01) |

(52) U.S. Cl.
CPC .............. *H01M 2/06* (2013.01); *H01M 2/043* (2013.01); *H01M 2/22* (2013.01); *H01M 2/1235* (2013.01); *H01M 2/347* (2013.01); *H01M 2220/20* (2013.01)

(58) Field of Classification Search
CPC ........... H01M 2/06; H01M 2/043; H01M 2/22

USPC .......................................... 429/123, 129, 186
See application file for complete search history.

(56) References Cited

U.S. PATENT DOCUMENTS

| 2006/0024578 | A1 | 2/2006 | Lee | |
| 2011/0039152 | A1* | 2/2011 | Kim | H01M 2/1022 429/178 |
| 2011/0311851 | A1* | 12/2011 | Shinoda | H01M 2/263 429/94 |
| 2012/0088138 | A1* | 4/2012 | Munenaga | H01M 2/0443 429/94 |
| 2012/0171525 | A1 | 7/2012 | Guen | |

(Continued)

FOREIGN PATENT DOCUMENTS

| JP | 2012-199021 A | 10/2012 |
| JP | 2014-38736 A | 2/2014 |
| JP | 2015146252 A * | 8/2015 |

(Continued)

*Primary Examiner* — Sean P Cullen
(74) *Attorney, Agent, or Firm* — Lewis Roca Rothgerber Christie LLP (57) ABSTRACT

There is provided a secondary battery including a case having an internal space, an electrode assembly inserted into the case and including a first electrode plate, a second electrode plate, and a separator between the first electrode plate and the second electrode plate, an electrode tab electrically connected to the electrode assembly, a cap plate sealing the case, a current collector electrically connected to the electrode tab, an electrode terminal electrically connected to the current collector and configured to pass through the cap plate to protrude toward the outside, and a connector having an end coupled to the electrode assembly and an other end coupled to the current collector.

9 Claims, 5 Drawing Sheets

(56) References Cited

U.S. PATENT DOCUMENTS

| | | | |
|---|---|---|---|
| 2013/0078505 A1* | 3/2013 | Kim | H01M 2/18 429/179 |
| 2014/0377607 A1* | 12/2014 | Urano | H01M 10/0431 429/94 |

FOREIGN PATENT DOCUMENTS

| KR | 10-2006-0010482 A | 2/2006 |
|---|---|---|
| KR | 10-2012-0075849 A | 7/2012 |

* cited by examiner

SECONDARY BATTERY INCLUDING CONNECTOR COUPLED TO ELECTRODE ASSEMBLY AND CURRENT COLLECTOR

CROSS-REFERENCE TO RELATED APPLICATION

This application claims priority to, and the benefit of, Korean Patent Application No. 10-2015-0132406, filed on Sep. 18, 2015 with the Korean Intellectual Property Office, the entire content of which is herein incorporated by reference.

BACKGROUND

1. Field

The present invention relates to a secondary battery.

2. Description of the Related Art

In general, a secondary battery can be repeatedly charged and discharged, unlike a primary battery which is not designed to be recharged. Low capacity batteries that use single battery cells are used as power sources for various portable small-sized electronic devices such as cellular phones, and camcorders. High power batteries that use tens of battery cells connected to each other in a battery pack are used as power sources for electric scooters, hybrid vehicles, or electric vehicles.

Secondary batteries are manufactured in various shapes such as a cylindrical shape, a pouch shape, or a prismatic shape. A secondary battery is generally constructed by forming an electrode assembly by disposing a separator as an insulator between a positive electrode plate and a negative electrode plate, accommodating the electrode assembly in a case together with electrolyte, and installing a cap plate on the case. The electrode assembly is connected to electrode terminals, which protrude from the cap plate and are exposed to the exterior of the secondary battery.

An electrode tab of a secondary battery may be connected to a current collector, which is connected to an electrode terminal, and the electrode terminal may pass through a cap plate to then be exposed or protruded to an exterior side of the secondary battery. With this configuration, a connected portion between the current collector and the electrode tab may be damaged due to an external vibration or external mechanical shock. Accordingly, there is a need for a secondary battery having a structure for preventing or reducing damage to an electrode assembly.

SUMMARY

Aspects of embodiments of the present invention are directed to a secondary battery, which can prevent or substantially prevent a welding portion between a current collector and an electrode tab from being damaged due to a load of an electrode assembly.

The above and other aspects of the present invention will be described in or be apparent from the following description of exemplary embodiments.

According to some embodiments of the present invention, there is provided a secondary battery including: a case having an internal space; an electrode assembly inserted into the case and including a first electrode plate, a second electrode plate, and a separator between the first electrode plate and the second electrode plate; an electrode tab electrically connected to the electrode assembly; a cap plate sealing the case; a current collector electrically connected to the electrode tab; an electrode terminal electrically connected to the current collector and configured to pass through the cap plate to protrude toward the outside; and a connector having an end coupled to the electrode assembly and an other end coupled to the current collector.

In an embodiment, the connector includes: a fastening portion at a top portion of the connector; a connecting portion downwardly elongated from the fastening portion; and a coupling portion downwardly elongated from the connecting portion and coupled to a lateral surface of the electrode assembly.

In an embodiment, the fastening portion is a protrusion shaped as a triangular pillar, and wherein a rectangular opening is at an end of the current collector so that the fastening portion is inserted into the opening to be fastened with the connector.

In an embodiment, the fastening portion is bent and elongated from a top end of the connector and, wherein an opening is at the bent and elongated portion of the fastening portion so that the electrode terminal passes through the opening to be fastened with the connector.

In an embodiment, an elongation rate of the connector is smaller than that of the electrode tab.

In an embodiment, the electrode tab is configured to protrude from the electrode assembly by a greater length than the connecting portion.

In an embodiment, the secondary battery further includes a tape configured to couple the connector to the electrode assembly.

In an embodiment, the tape includes an insulating material.

In an embodiment, the connector includes polypropylene (PP), polyimide (PI), polyethylene (PE), and/or polycarbonate (PC).

In an embodiment, the connector is fastened to a portion of the current collector coupled to the electrode terminal.

As described above, in the secondary battery according to embodiments of the present invention, one end of the connector is fixed to the electrode assembly and the other end of the connector is fastened with the current collector extending to a bottom portion of the electrode terminal, thereby causing a load of the electrode assembly to be applied to the bottom portion of the electrode terminal coupled with a relatively large coupling strength.

Therefore, unlike the secondary battery of the related art, it is possible to prevent or substantially prevent the load of the electrode assembly from being applied to a welding surface between the current collector and the electrode tab. In addition, it is possible to prevent or substantially prevent the current collector and the electrode tab from being separated from each other due to an external vibration or an external mechanical shock.

BRIEF DESCRIPTION OF THE DRAWINGS

The above and other features of the present invention will become more apparent by describing in detail exemplary embodiments of the present invention with reference to the attached drawings in which.

DETAILED DESCRIPTION

Hereinafter, examples of embodiments of the invention will be described in detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims, and equivalents thereof.

In the drawings, the thickness of layers and regions are exaggerated for clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B, or an intervening element C may be present between the elements A and B so that the element A can be indirectly connected to the element B.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" or "include" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "below," "beneath," "lower," "above," "upper," and the like, may be used herein for ease of description to describe one element's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
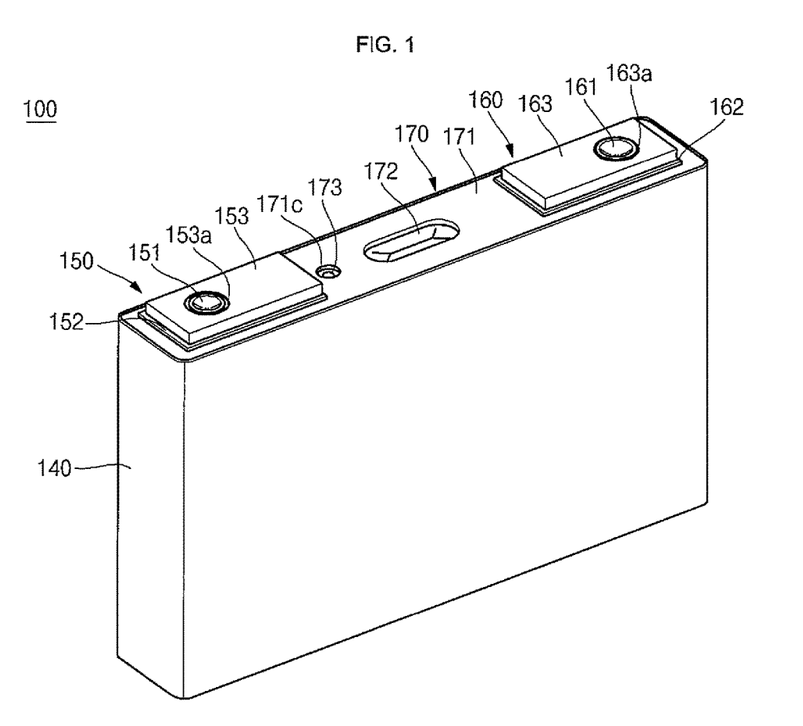
FIG. 1 is a perspective view of a secondary battery according to an embodiment of the present invention.
Figure 2:
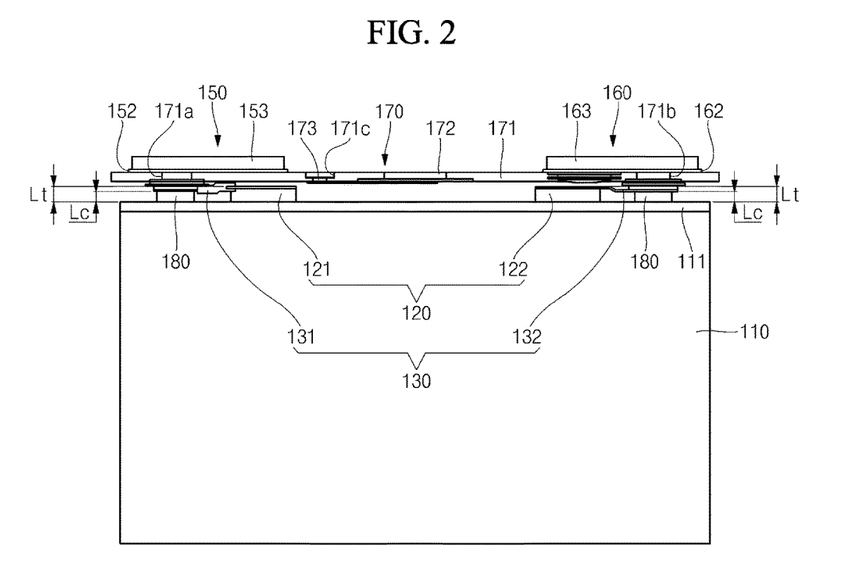
FIG. 2 is a view illustrating an internal structure of a case in the secondary battery shown in FIG. 1.

FIG. 1 is a perspective view of a secondary battery according to an embodiment of the present invention, and FIG. 2 is a view illustrating an internal structure of a case in the secondary battery shown in FIG. 1.

Referring to FIGS. 1 and 2, the secondary battery 100 according to an embodiment of the present invention may include an electrode assembly 110, an electrode tab 120, a current collector 130, a case 140, a first electrode 150, a second electrode 160, a cap assembly 170, a connector 180, and a tape 190.

In the secondary battery 100 according to an embodiment of the present invention, the electrode assembly 110 may include two electrode assemblies.

In addition, each of the electrode assemblies 110 includes a first electrode plate, a second electrode plate, which are formed of plates or layers, and a separator disposed between the first electrode plate and the second electrode plate. In addition, the electrode assembly 110 is formed by winding or laminating a stack of the first electrode plate, the second electrode plate, and the separator. The first electrode plate may function as a positive electrode or a negative electrode. The second electrode plate may have polarity opposite to that of the first electrode plate. In the embodiment of the present invention, the electrode assembly 110 may have a jelly-roll configuration.

The first electrode plate as a positive electrode may be made of a metal foil, such as aluminum foil, and may have a first electrode active material layer including a lithium-based oxide coated on both surfaces of the first electrode plate. The second electrode plate as a negative electrode may be made of a metal foil, such as a copper foil, and may have a second electrode active material layer mainly including a carbon material coated on both surfaces of the second electrode plate. In addition, an uncoated portion 111 is provided on each of the first electrode plate and the second electrode plate to become a path for current flow. In addition, the separator may be positioned between the first electrode plate and the second electrode plate to prevent or substantially prevent a short-circuit and allow movement of lithium ions. The separator may be formed of polyethylene, polypropylene, a composite film of polyethylene and polypropylene, and/or the like. However, the present invention does not limit materials of the first electrode plate, the second electrode plate and the separator to those disclosed herein, and any suitable material may be used.

The electrode tab 120 may include a first electrode tab 121 and a second electrode tab 122.

In the secondary battery 100 according to an embodiment of the present invention, the first electrode tab 121 and the second electrode tab 122 may be formed on respective ones of the two electrode assemblies 110.

The first electrode tab 121 may be formed such that it is extended from one side of the uncoated portion of the first electrode plate in a bar shape. Alternatively, the first electrode tab 121 may be formed by electrically connecting a separate bar to the first electrode plate. The bar formed in the first electrode plate may include a plurality of bars. In this case, the first electrode tab 121 may be formed by stacking the bars on one another. Therefore, the first electrode tab 121 may be made of the same metal as the first electrode plate, such as aluminum.

The second electrode tab 122 may be formed such that it is extended from one side of the uncoated portion of the second electrode plate in a bar shape. Alternatively, the second electrode plate may be formed by electrically connecting a separate bar to the second electrode plate. The bar formed in the second electrode plate may include a plurality of bars. In this case, the second electrode tab 122 may be formed by stacking the bars on one another. Therefore, the second electrode tab 122 may be made of the same metal as the second electrode plate, such as copper.

However, the present invention does not limit materials of the first electrode tab 121 and the second electrode tab 122 to those disclosed herein, and any suitable material may be used.

The current collector 130 may include a first current collector 131 and a second current collector 132.

One end of the first current collector 131 has a contact surface to be connected to the first electrode tab 121. The one end of the first current collector 131 may be electrically connected to the first electrode tab 121 by ultrasonic welding, electric welding, arc welding, and/or the like. The other end of the first current collector 131 is extended along a bottom surface of the cap plate 171. The other end of the first current collector 131 has a terminal hole (e.g., a terminal opening) 131a to allow the first electrode terminal 151 to pass therethrough and a connector hole (e.g., a connector opening) 131b to be fastened with the connector 180. In addition, the first current collector 131 may be made of a metal, such as aluminum, an aluminum alloy, and/or the like.

One end of the second current collector 132 has a contact surface to be connected to the second electrode tab 122. The one end of the second current collector 132 may be electrically connected to the second electrode tab 122 by ultrasonic welding, electric welding, arc welding, and/or the like. The other end of the second current collector 132 is extended along a bottom surface of the cap plate 171. The other end of the second current collector 132 has a terminal hole (a terminal opening) 132a to allow the second electrode terminal 161 to pass therethrough and a connector hole (a connector opening) 132b to be fastened with the connector 180. In addition, the second current collector 132 may be made of a metal, such as copper or a copper alloy.

However, the present invention does not limit materials of the first current collector 131 and the second current collector 132 to those disclosed herein, and any suitable material may be used.

The case 140 has a receiving space in an interior side of an opening and accommodates the electrode assembly 110 and an electrolyte in the receiving space. The case 140 is made of a metal, such as aluminum, an aluminum alloy, and/or the like. The electrolyte may include a lithium salt dissolved in an organic solvent and may exist in a liquid, a solid, or a gel phase.

However, the present invention does not limit materials of the case 140 to those disclosed herein, and any suitable material may be used.

The first electrode 150 may include a first electrode terminal 151, a first fastening plate 152, and a first terminal plate 153.

The first electrode terminal 151 is drawn out through a terminal hole 131a of the first current collector 131 and a terminal hole (e.g., a terminal opening) 171a of the cap plate 171. The first electrode terminal 151 is electrically connected to the first current collector 131. In addition, the first electrode terminal 151 may also be electrically connected to the cap plate 171 and may have the same polarity as the cap plate 171. The first electrode terminal 151 may be made of a metal, such as aluminum, an aluminum alloy, and/or the like.

The first fastening plate 152 may have a terminal hole formed at a portion from which the first electrode terminal 151 protrudes so as to allow the first electrode terminal 151 to pass therethrough to then be coupled with the first terminal plate 153. The first fastening plate 152 may be coupled to a top portion of the cap plate 171 and allows the first terminal plate 153 to be mounted thereon.

The first terminal plate 153 may have a terminal hole (e.g., a terminal opening) 153a formed at a portion from which the first electrode terminal 151 protrudes so as to allow the first electrode terminal 151 to pass therethrough to then be coupled with first terminal plate 153. The first terminal plate 153 may be coupled to a top portion of the first fastening plate 152. The first fastening plate 152 may be coupled to the first terminal plate 153 by riveting followed by welding or further riveting. Therefore, coupling strengths of the first electrode terminal 151 with respect to the first fastening plate 152, the first terminal plate 153 and the cap plate 171 are higher than those of other regions. The first electrode terminal 151 is electrically connected to the first terminal plate 153. In addition, the first terminal plate 153 is made of a metal, such as aluminum, an aluminum alloy, and/or the like. When the first fastening plate 152 is made of a conductive material, the first terminal plate 153 may be electrically connected to the cap plate 171 through the first fastening plate 152. However, the present invention does not limit materials of the first electrode terminal 151, the first fastening plate 152, and the first terminal plate 153 to those disclosed herein, and any suitable material may be used.

The second electrode 160 may include a second electrode terminal 161, a second fastening plate 162, and a second terminal plate 163.

The second electrode terminal 161 is drawn out through a terminal hole 132a of the second current collector 132 and a terminal hole (e.g., a terminal opening) 171b of the cap plate 171. The second electrode terminal 161 is electrically connected to the second current collector 132. In addition, when the first electrode terminal 151 is electrically connected to the cap plate 171, the second electrode terminal 161 is insulated from the cap plate 171 by an insulation member. The second electrode terminal 161 may be made of a metal, such as copper, a copper alloy, and/or the like.

The second fastening plate 162 may include a terminal hole formed at a portion from which the second electrode terminal 161 protrudes so as to allow the second electrode terminal 161 to pass therethrough to then be coupled with the second terminal plate 163. The second fastening plate 162 may be coupled to a top portion of the cap plate 171 and allows the second terminal plate 163 to be mounted thereon.

The second terminal plate 163 may have a terminal hole (e.g., a terminal opening) 163a formed at a portion from which the second electrode terminal 161 protrudes so as to allow the second electrode terminal 161 to pass therethrough to then be coupled with the second terminal plate 163. The second terminal plate 163 may be coupled to a top portion of the second fastening plate 162. The protruding part of the second electrode terminal 161 may be coupled to the second terminal plate 163 by riveting followed by welding or further riveting. Therefore, coupling strengths of the second electrode terminal 161 with respect to the second fastening plate 162, the second terminal plate 163, and the cap plate 171 are higher than those of other regions. The second electrode terminal 161 is electrically connected to the second terminal plate 163. The second terminal plate 163 is made of a metal, such as copper, a copper alloy, and/or the like. In addition, when the cap plate 171 has the same polarity as the first electrode terminal 151, the second fastening plate 162 made of an insulating material electrically insulates the second electrode terminal 161 from the cap plate 171. However, the present invention does not limit materials of the second electrode terminal 161, the second fastening plate 162, and the second terminal plate 163 to those disclosed herein, and any suitable material may be used.

The cap assembly 170 may include the cap plate 171, a safety vent 172 and a plug 173.

The cap plate 171 is coupled to the case 140 and seals the opening of the case 140. To allow the first electrode terminal 151 and the second electrode terminal 161 to protrude outward from the cap plate 171, the terminal holes 171a and 171b may be provided at portions from which the first electrode terminal 151 and the second electrode terminal 161 protrude. In addition, an electrolyte injection hole (an electrolyte injection opening) 171c for electrolyte injection may also be provided. When the first electrode terminal 151 and the cap plate 171 have the same polarity, the case 140 may also be electrically connected to the first electrode terminal 151. In addition, the cap plate 171 and the case 140 may be made of the same material. However, the present invention does not limit materials of the cap plate 171 to those disclosed herein, and any suitable material may be used.

The safety vent 172 may be positioned at a central region of the cap plate 171. In addition, the safety vent 172 may be installed in a vent hole (e.g., a vent opening) passing through the cap plate 171 as a separate member or may be installed in the cap plate 171 to be integrally formed with the cap plate 171. When the internal pressure of the secondary battery 100 is increased due to over-charge, the safety vent 172 may be ruptured; thereby preventing the secondary battery 100 from exploding or significantly reducing the odds thereof.

The plug 173 seals the electrolyte injection hole 171c.

Figure 4:
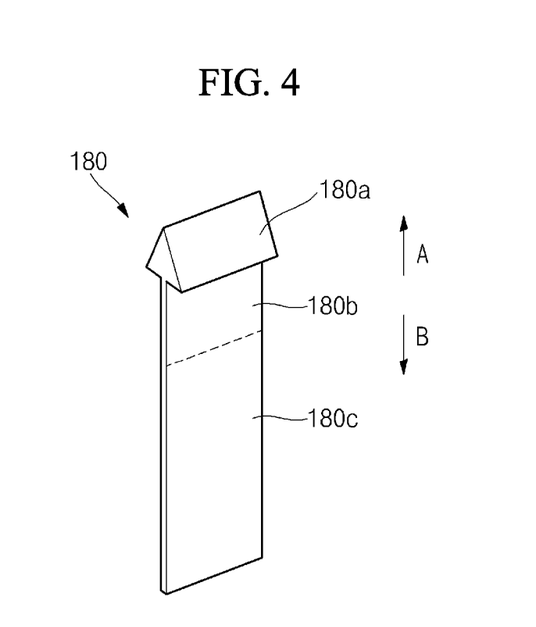
FIG. 4 is a perspective view of a connector according to an embodiment of the present invention.

The connector 180 is primarily shaped as a bar and may include a fastening portion 180a, a connecting portion 180b, and a coupling portion 180c.

Figure 3:
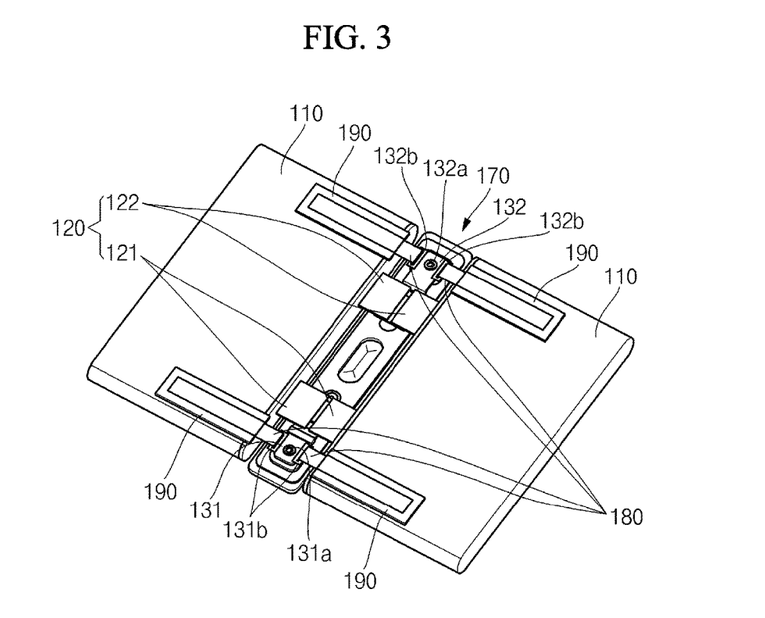
FIG. 3 is a perspective view illustrating electrode assembly of a secondary battery in an unfolded state according to an embodiment of the present invention.
Figure 5:
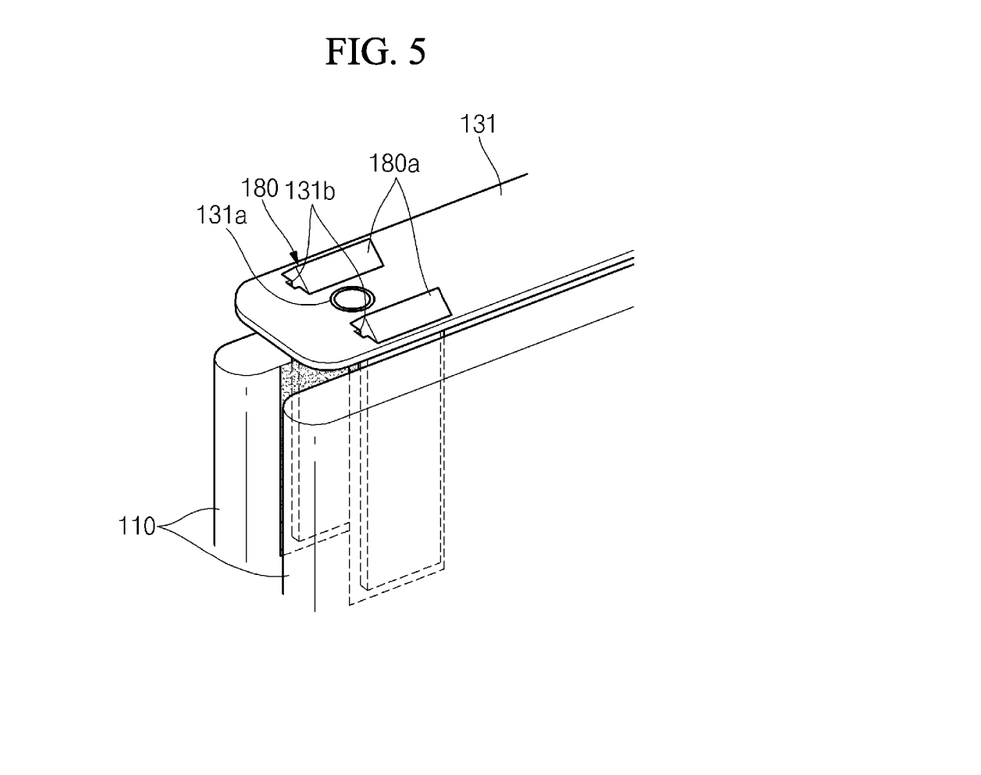
FIG. 5 is an enlarged perspective view illustrating a coupling portion between the connector shown in FIG. 4 and a current collector.
Figure 6:
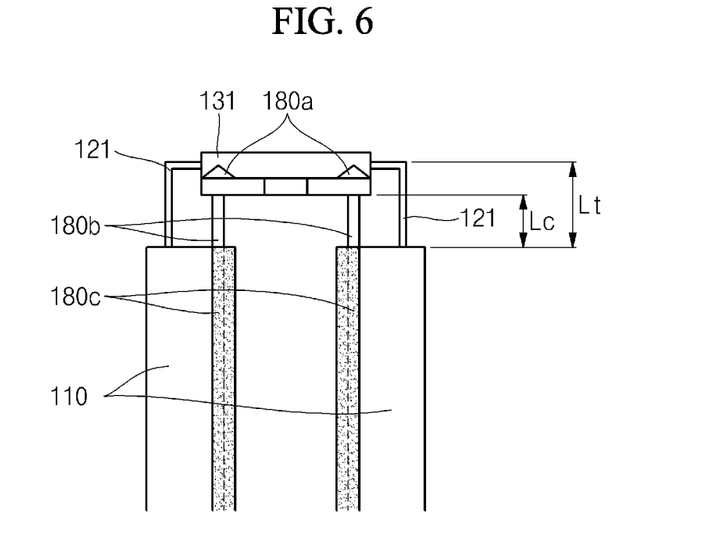
FIG. 6 is an enlarged side view illustrating a lateral surface of the coupling portion shown in FIG. 5.

FIG. 3 is a perspective view illustrating an electrode assembly of a secondary battery in unfolded state according to an embodiment of the present invention, FIG. 4 is a perspective view of a connector according to an embodiment of the present invention, FIG. 5 is an enlarged perspective view illustrating a coupling portion between the connector shown in FIG. 4 and a current collector, and FIG. 6 is an enlarged side view illustrating a lateral surface of the coupling portion shown in FIG. 5.

Referring to FIGS. 3 to 6, the fastening portion 180a may be a protrusion shaped as a triangular pillar formed at a top end of the connector 180. The fastening portion 180a is inserted into the connector hole 131b/132b of the current collector 131/132 to then be fastened therewith. The connector hole 131b/132b of the current collector 131/132 may be a rectangular hole (e.g., opening) to be fastened with the fastening portion 180a. The triangular pillar shape of the fastening portion 180a is easily engaged with the connector hole 131b/132b of the current collector 131/132 in a direction (A) in which it is inserted into the connector hole 131b/132b of the current collector 131/132. However, it may not be easy to disconnect the fastening portion 180a shaped as a triangular pillar from the connector hole 131b/132b of the current collector 131/132 in a direction (B) opposite to the inserted direction (A). The connecting portion 180b may be elongated in a bar shape from the fastening portion 180a to the top end of the electrode assembly 110. In addition, the coupling portion 180c may be elongated in a bar shape from the connecting portion 180b to then be coupled to a lateral surface of the electrode assembly 110.

Because the first electrode terminal 151 and the second electrode terminal 161 are coupled to the first terminal plate 153 and the second terminal plate 163 by riveting followed by welding or further riveting, ends of the current collectors 131 and 132, at which the connector holes 131b and 132b are formed, have high coupling strengths enough to support the load applied to the electrode assembly 110. Therefore, once the connector 180 is inserted into and fastened with the electrode assembly 110, it is possible to withstand the load of the electrode assembly 110.

A length Lc of the connecting portion 180b of the connector 180 protruded from the electrode assembly 110 may be smaller than a length Lt of the electrode tab 120 protruded from the electrode assembly 110 (i.e., Lc<Lt). Therefore, the load of the electrode assembly 110 is applied to a coupling portion between the connector 180 and the current collector 130, rather than to the electrode tab 120, thereby preventing or substantially preventing the coupling portion of the electrode tab 120 from being damaged due to the load of the electrode assembly 110 or due to an external vibration.

The connector 180 may be installed where each of the first electrode terminal 151 and the second electrode terminal 161 is positioned. In addition, the connectors 180 installed where the first electrode terminal 151 and the second electrode terminal 161 are positioned may be fastened with the connector holes 131b and 132b of the current collectors 131 and 132, respectively. Because the secondary battery 100 according to an embodiment of the present invention includes two electrode assemblies 110, the two connectors 180 may be installed in respective ones of the two electrode assemblies 110.

In addition, the connector 180 may be made of a plastic material having excellent heat resistance and high chemical resistance and a small elongation rate. The plastic material may be one selected from the group consisting of polypropylene (PP), polyimide (PI), polyethylene (PE), and polycarbonate (PC).

In addition, an elongation rate of the connector 180 is smaller than that of the electrode tab 120. Accordingly, even if the load is repeatedly applied to the secondary battery 100 according to an embodiment of the present invention, the load of the electrode assembly 110 may still concentrate on the connector 180. Therefore, the connector 180 may prevent or substantially prevent the load of the electrode assembly 110 from being applied to a welded portion between the electrode tab 120 and the current collector 130, thereby preventing or substantially preventing the welded portion between the electrode tab 120 and the current collector 130 from being damaged.

The tape 190 may be positioned on the coupling portion 180c to combine the connector 180 with a lateral surface of the electrode assembly 110. In addition, the tape 190 may be made of a material having excellent heat resistance, high chemical resistance, and an insulating property.

Figure 7:
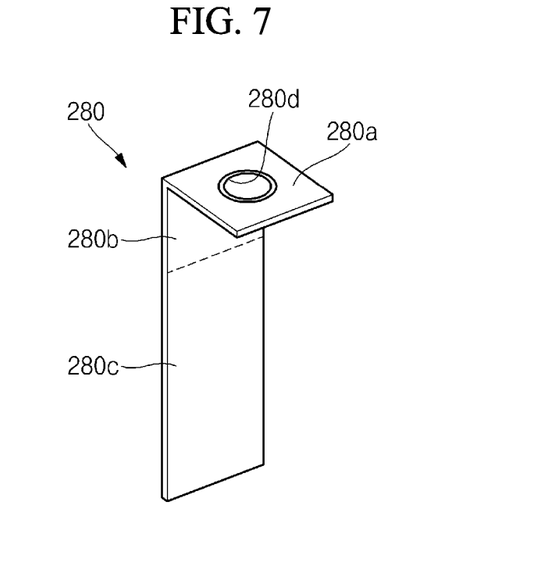
FIG. 7 is a perspective view of a connector according to another embodiment of the present invention.
Figure 8:
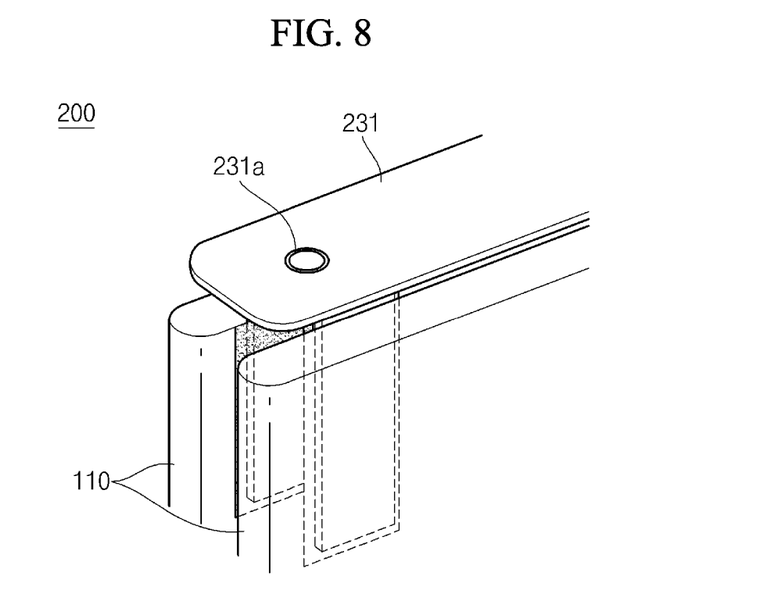
FIG. 8 is an enlarged perspective view illustrating a coupling portion between the connector shown in FIG. 7 and a current collector.
Figure 9:
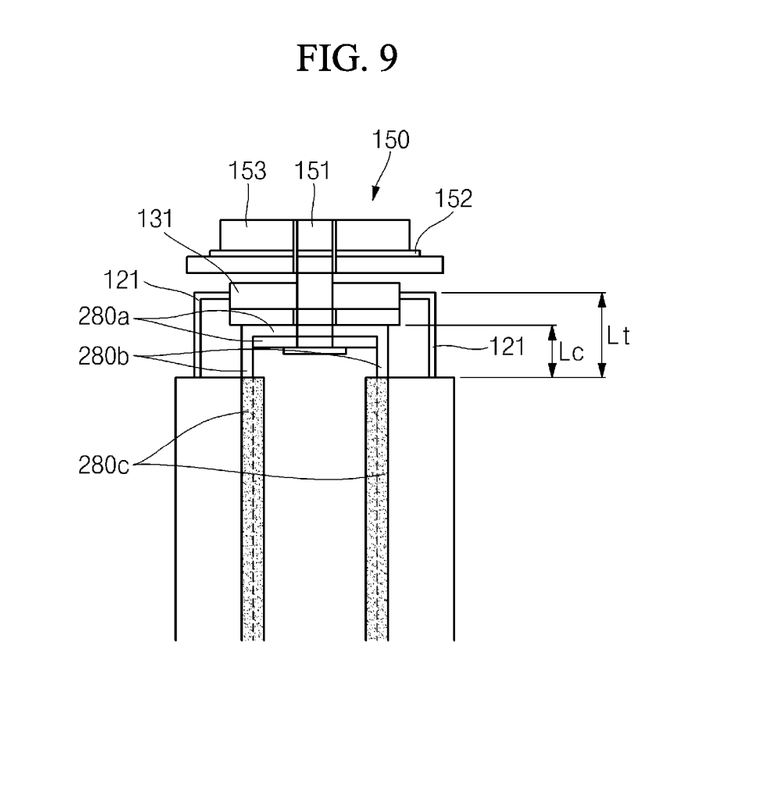
FIG. 9 is an enlarged side view illustrating a lateral surface of the coupling portion shown in FIG. 8.

FIG. 7 is a perspective view of a connector according to another embodiment of the present invention, FIG. 8 is an enlarged perspective view illustrating a coupling portion between the connector shown in FIG. 7 and a current collector, and FIG. 9 is an enlarged side view illustrating a lateral surface of the coupling portion shown in FIG. 8.

Referring to FIGS. 7 to 9, a secondary battery 200 according to another embodiment of the present invention may include an electrode assembly 110, an electrode tab 120, a current collector 230, a case 140, a first electrode 150, a second electrode 160, a cap assembly 170, a connector 280, and a tape 190. The same functional component as that of the previous embodiment is denoted by the same reference numeral and the following description will focus on differences between the present and previous embodiments.

The current collector 230 may include a first current collector 231 and a second current collector.

One end of the first current collector 231 is coupled to the first electrode tab 121, and a terminal hole (e.g., a terminal opening) 231a allowing the first electrode terminal 151 to pass therethrough is formed at the other end of the first current collector 231. However, a separate hole to be fastened with the first connector 281 is not formed in the first current collector 231.

One end of the second current collector is coupled to the second electrode tab 122, and a terminal hole (e.g., a terminal opening) allowing the second electrode terminal 161 to pass therethrough is formed at the other end of the second current collector. However, a separate hole to be fastened with the second connector 282 is not formed in the second current collector.

The connector 280 is primarily shaped as a bar and may include a fastening portion 280a, a connecting portion 280b, and a coupling portion 280c.

The fastening portion 280a is bent and elongated from a top end of the connector 280 and a terminal hole (a terminal opening) 280d is formed at the bent and elongated portion of the fastening portion 280a so that the first electrode terminal 151 or the second electrode terminal 161 passes through the terminal hole (e.g., a terminal opening) 280d to be fastened with the connector 280. The first electrode terminal 151 or the second electrode terminal 161 may pass through the terminal hole 280d formed in the fastening portion 280a to then be upwardly protruded from the cap plate 171. In addition, as the protruded first and second electrode terminals 151 and 161 are riveted to the first terminal plate 153 and the second terminal plate 163, the connector 280, and the current collector 130 are fastened with each other.

Therefore, even if a separate hole is not provided at an end of the current collector 130, the connector 280 can be fastened with the current collector by riveting the first electrode terminal 151 and the second electrode terminal 161.

As described above, in the secondary battery 100/200 according to the present invention, one end of the connector 180/280 is fixed to the electrode assembly 110 and the other end thereof is fastened with the current collector 130/230 elongated to a bottom portion of the electrode terminal 151/161, thereby leading the load of the electrode assembly 110 to be applied to the bottom portion of the electrode terminal 151/161 coupled with a relatively large coupling strength.

Therefore, according to the present invention, it is possible to prevent or substantially prevent the load of the electrode assembly 110 from being applied to a welding surface between the current collector 130/230 and the electrode tab 120. In addition, it is also possible to prevent or substantially prevent the current collector 130/230 and the electrode tab 120 from being separated from each other due to an external vibration or due to an external mechanical shock.

While the secondary battery of the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A secondary battery comprising:
    a case having an internal space;
    an electrode assembly inserted into the case and including a first electrode plate, a second electrode plate, and a separator between the first electrode plate and the second electrode plate;
    an electrode tab electrically connected to the electrode assembly;
    a cap plate sealing the case;
    a current collector electrically connected to the electrode tab;
    an electrode terminal electrically connected to the current collector and configured to pass through the cap plate to protrude toward the outside along an extension direction of the electrode terminal; and
    a connector having an end coupled to the electrode assembly and an other end coupled to the current collector, the connector comprising a fastening portion having a protrusion shaped as a triangular pillar and extending through the current collector along the extension direction of the electrode terminal.

2. The secondary battery of claim 1, wherein the connector is fastened to a portion of the current collector coupled to the electrode terminal.

3. The secondary battery of claim 1, wherein the connector is made of at least one material selected from the group consisting of polypropylene (PP), polyimide (PI), polyethylene (PE), and polycarbonate (PC).

4. The secondary battery of claim 1, further comprising a tape configured to couple the connector to the electrode assembly.

5. The secondary battery of claim 4, wherein the tape comprises an insulating material.

6. The secondary battery of claim 1, wherein the connector comprises:
    a connecting portion downwardly elongated from the fastening portion; and
    a coupling portion downwardly elongated from the connecting portion and coupled to a lateral surface of the electrode assembly, and
    wherein the fastening portion is at a top portion of the connector.

7. The secondary battery of claim 6, wherein a rectangular opening is at an end of the current collector so that the fastening portion is inserted into the opening to be fastened with the connector.

8. The secondary battery of claim 6, wherein an elongation rate of the connector is smaller than that of the electrode tab.

9. The secondary battery of claim 6, wherein the electrode tab is configured to protrude from the electrode assembly by a greater length than the connecting portion.

* * * * *